UNITED STATES PATENT OFFICE.

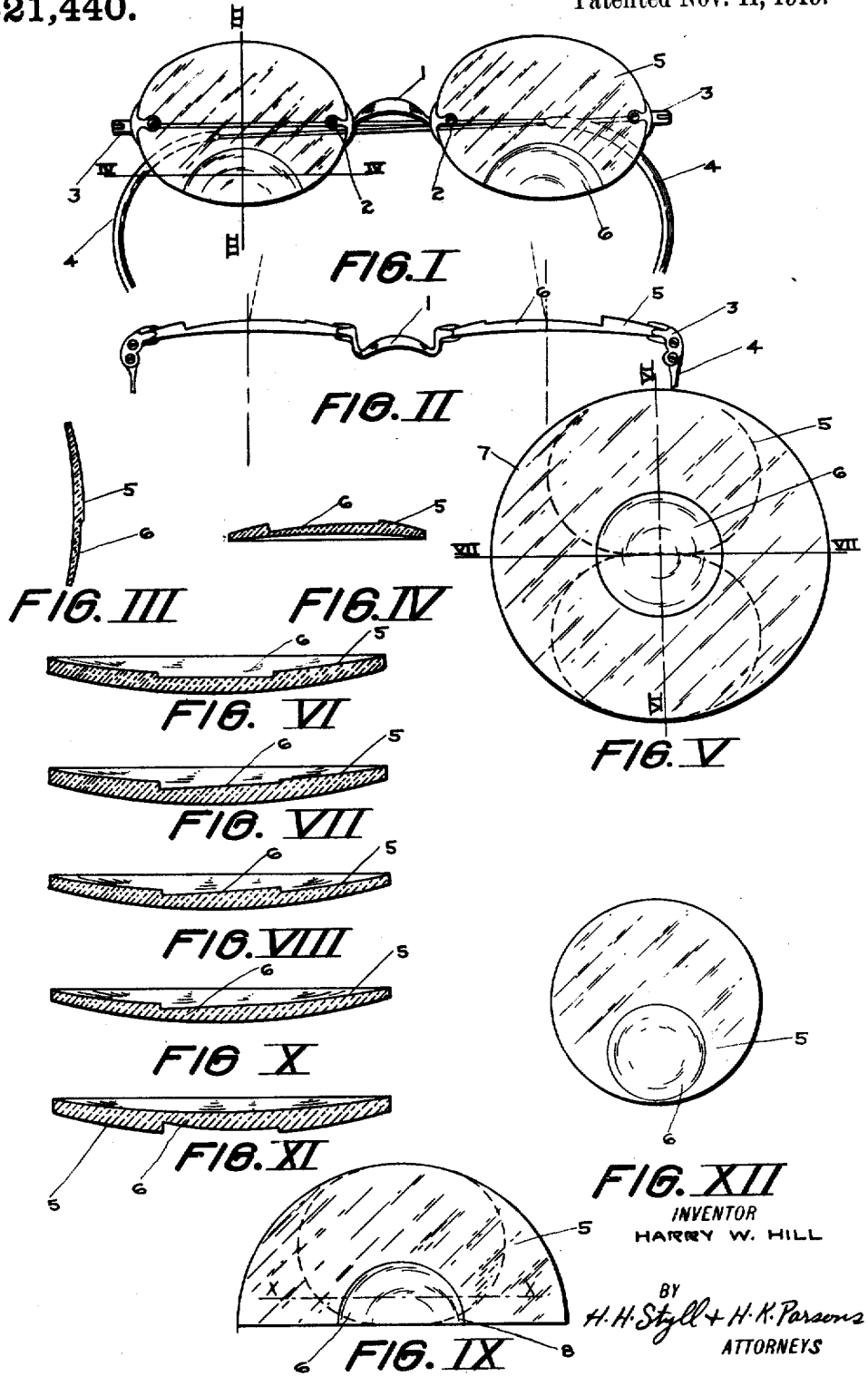

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS.

1,321,440.      Specification of Letters Patent.      Patented Nov. 11, 1919.

Application filed April 16, 1918. Serial No. 228,862.

*To all whom it may concern:*

Be it known that I, HARRY W. HILL, a citizen of the United States, residing at Southbridge, in the county of Worcester and State of Massachusetts, have invented certain new and useful Improvements in Lenses, of which the following is a specification.

This invention relates to improvements in lenses and has particular reference to lenses commonly termed the bifocal type, which are designed to embody separate corrections for near and distant vision within a single lens.

The leading object of the present invention is the provision of a novel and improved construction of lens in which the best correction and the one which will cause the least muscular strain on the part of the wearer will be provided but which at the same time will permit of symmetrical arrangement of the reading portions or segments of the lens as respects the major portion thereof.

A further object of the present invention is the provision of a novel and improved lens constructed from a single piece of glass and having the reading portion so disposed with respect to the distance portion as to compensate in part for the normal convergence of the eyes ordinarily required when looking at near objects.

A further and important object of the present invention is the provision of a novel and improved manner or process of practicably commercially producing an improved lens of the type aforesaid.

Other objects and advantages of my improved construction should be readily apparent by reference to the following specification taken in connection with the accompanying drawings, and it will be understood that I may make any modifications in the specific details of construction or order of steps of my process within the scope of the appended claims without departing from or exceeding the spirit of my invention.

Figure I represents a front view of a pair of spectacles embodying my invention.

Fig. II represents an edge view thereof.

Fig. III represents a sectional view as on the line III—III of Fig. I.

Fig. IV represents a similar view on the line IV—IV.

Fig. V represents a plan view of one form of blank from which my lenses may be formed.

Fig. VI represents a sectional view as on the line VI—VI of Fig. V.

Fig. VII represents a similar view on the line VII—VII.

Fig. VIII represents a view similar to Fig. VII illustrating a slightly modified construction.

Fig. IX represents a plan view of a half bank illustrating in dotted lines how the lens is finally cut therefrom.

Fig. X represents a sectional view as on the line X—X showing the completed lens so formed.

Fig. XI represents an edge view of a split blank from which a lens such as shown in Fig. II would be formed.

Fig. XII represents a plan view of a slightly different lens.

In the drawings the numeral 1 designates a spectacle bridge bearing at each end the clips 2 engaging my improved lenses which are further engaged at their outer ends as by the end piece members 3 bearing the retaining temples 4.

My improved lens comprises a distance portion 5 and a reading portion 6. These parts may either have different dioptric values as when it is necessary to employ a stronger correction for reading than for distant vision, or may both have the same corrective value as when the difficulty with the eyes is a muscular trouble in which application of prism will assist the eye in reading due to weakness of the converging muscles but such prism is not required for distant vision.

In the carrying out of my invention I preferably construct my improved lenses in such manner that the early grinding operations will form two lenses at a time in place of but a single lens, thus lessening the cost of production of the same. In attaining this result I preferably make use of a circular blank as 7 shown in Fig. V and shown in split form in several of the other figures. This blank has preferably a continuous annular outer surface on one face intended to form the portion 5 for distant vision and has a central circular portion adapted to form the segment 6 for near vision in each lens. It will be understood that the order of steps of forming these two surfaces is immaterial in that either the inner circular portion 6 may first be formed, ground, and polished, and afterward the portion 5 ground and polished, or the portion 5 may first be made or the several parts may be simultaneously ground or polished as desired. Similarly, the curve on the opposite face of the lens may be ground either before the near and distant vision curves or subsequent to the formation of the near and distant curves, and may be formed either before the blank is split to form the finished lens or after it has been so split. In fact, it is entirely possible to take a pair of ordinary finished lenses and suitably mount them up and then grind away portions of the pair of lenses thus mounted to form either the distant vision area 5 or the near vision area 6 according to whether the lenses initially have the power etc. desired for the reading or for the distance portion of the lens. Similarly, a lens of my improved type may be formed as indicated in Fig. XII, a lens at a time, by taking a single lens and grinding the second surface on one side of it although this of course does not produce as economical and satisfactory manufacturing results as does the form and process more particularly illustrated.

As respects my improved one piece bifocal lens, the novelty resides particularly in the position of the segment as respects the remainder of the lens. Prior to my present invention it has been customary in the formation of one piece lenses having a portion for near and a portion for distant vision to construct the lens with the line of division between the two surfaces of equal thickness at the nasal and outer sides, and it has then been customary to twist or laterally shift the lens rendering the lens asymmetrical in that the segment will be disposed not centrally of the lens but inset inwardly in order to obtain best results for the patient. The reason for this is that when the eyes are looking at a near object, the line of vision is convergent, see dotted lines in Fig. II, and, therefore, is not through the vertical center lines of the lenses but inwardly of such lines and when the eyes look inwardly of these lines, certain prism difficulties are introduced necessitating additional activity and strain on the eye-controlling muscles to properly balance such prism effects. Certain fitters, therefore, as stated have decentered the lower portion of the lens inward to obviate this difficulty while others responding to the demands of the patient for the best looking lens possible form the lens with the segment or reading portions symmetrically located and depend on the eye of the patient to take care of the difficulties thus introduced.

It is, therefore, one of the leading objects of my present invention to do away with these difficulties to enable the segment to be symmetrically located and at the same time relieve the eye of the strain aforesaid. In the accomplishment of this result it will, therefore, be seen that as illustrated in Figs. II, IV, and X, I so form my lens that in the finished article the reading portion or segment in place of meeting the distant vision portion in a line of joinder of equal thickness at all points of its length will meet it in a line of joinder of unequal height, the result being that the entire segment is tilted with respect to the optical axis of the distance portion to introduce into the lens for normal eyes a prism base-in, that is to say, a prism the thickest portion of which is on the nasal side of the lens in, the reading portion at its geometrical center in the finished lens without corresponding prism in the distance portion. If desired, and as an example of the great advantage and utility of my present invention, attention is invited to the fact that my lens may be calculated to introduce any desired prism so that, for example, the prism will be such that the person's eyes will be exactly parallel when looking through the centers of two distant lenses at a distant object and the lines of vision may maintain the same parallel relation when looking at an object at the normal reading distance of fifteen or sixteen inches, the necessary convergence being accomplished entirely by the tilt of the reading segment with respect the major lens, and the muscles of the eye normally brought into play to converge the eyes in reading being relieved of this strain rendering reading much easier than under ordinary conditions.

In the manner of constructing my lens illustrated in connection with Fig. V it will be noted by reference to Figs. VI and VII that two lenses are ground at a time, the height of the line of separation at the opposite sides along the diameter VI—VI, for example, being equal, which line may fall either above, below, or exactly coincide with the surface of the portion 5 as may be desired, while in the opposite axis or meridian as on the line VII—VII the lines of division are of unequal height being deep at one side and high at the other, the portion 6 being either entirely below the portion 5 as shown in Figs. VI and VII, partially above and partially below as indicated in Fig. VIII, or if desired may be entirely above. In the case of the lens shown in Fig. V for example the lens is ground in the complete or target form and is subsequently divided as on the line VII—VII, thus providing two lenses, one for each eye, in which the reading portion 6 will be integral with the distance portions and will be tilted with respect thereto.

It will be noted that the reading portion may be formed on either face of the lens, being shown for example in Figs. II, III, IV, and XI on the outer and in the other figures on the inner face of the lens, and it will also be understood that the necessary curve on the opposite surface of the lens may be applied at any step during its formation or, as before mentioned, that my improved bifocal may be formed by the regrinding in part of a completed or finished lens. Attention is invited to the fact that in the case of initial formation of the reading portion, partially above and partially below the surface of the distance portion, the two surfaces will intersect or merge at one point which may be taken for example as the point 8 in Fig. IX, thus producing a substantially merged surface at the joinder of the two curves on their inner side in the case of the lens shown at Fig. X, or this point may be calculated to come at the center of the arc of joinder so that there will be no ridge for the eye to jump over in passing from the distance to the reading portion of the lens.

To further illustrate the efficiency and desirability of my improved form of bifocal lens I would call attention to the fact that it is well known to optical specialists that a normal coördination exists between the muscles of accommodation and convergence, which relationship is so well recognized a feature that the system of eye testing known as dynamic sciametry is based entirely upon this normal coördinate functioning. Therefore, if we put in front of the eyes lenses to relieve the accommodation it is highly desirable to produce a corresponding decrease in the functioning of convergence in order to best maintain the general balance of the eye and not call upon it for new and unusual methods of working.

Ordinarily in the prescribing of eyeglasses full relief of accommodation is not sought by the fitter, as usually a certain proportion is relieved while another portion is left for the proper exercise of the muscles of accommodation. The required prism for complete relief of convergence may be determined by well known optical formulæ as it bears a constant relationship to the power prescribed and consequently maintains the work of accommodation and of convergence equally distributed upon the eyes.

The eyes in a relaxed condition have parallel lines of vision when looking at a distance, which distance may be shortened by the addition of a lens of desired power and at the same time the parallel relationship of the lines of vision may be varied by causing them to converge at a certain distance.

From the foregoing it will, therefore, be found that the exact required prism addition in the reading portion of my lens for any particular power may be determined, which lens when constructed in accordance with my improvement will give perfect vision as respects distant objects, with relatively relaxed accommodation and convergent or divergent muscles, and when it is desired to use the eyes for nearer work it is merely necessary to drop them to the near or reading vision section, which on account of its character will leave the eyes in the same relaxed position as regards both convergent and divergent relation if the correction is right and will secure perfect fusion of the near images at the desired point of convergence without strain on the eye.

I claim:

1. The process of forming a lens for near and distant vision, consisting in forming on one face of a crystal a near vision portion with the line of division between the near vision portion and the remainder of the crystal of unequal height and splitting the crystal on an axis running through the high and low points of the line of division to produce two corresponding blanks having similar but oppositely disposed tilted reading portions, whereby a proper lens for each eye of the wearer may be formed from the single blank.

2. The process of forming a bifocal lens, consisting in forming on one face of a crystal a pair of concentrically located surfaces having eccentric axes of generation.

3. The process of forming a bifocal lens, consisting in forming on one face of a crystal a pair of concentrically located surfaces having eccentric axes of generation, and splitting the crystal to form a pair of similar portions having the prismatic values of the reading portions equal but oppositely disposed as respects the line of separation.

4. As a new article of manufacture, a lens blank in the form of a target having the bull's-eye portion of the target tilted at an angle to the target whereby the blank may be centrally split to provide a lens for each eye of the wearer and the split bull's-eye portions of the target will form prism segments bases in.

5. In an ophthalmic mounting, a pair of lenses having a portion adapted for distant vision and having formed integrally therewith a supplemental near vision portion, the near vision portions being symmetrically disposed on the lenses and having the nasal portions thicker than the outer portions, whereby the line of vision of the eye will be automatically converged to a proper near point.

6. An ophthalmic mounting, including a pair of lenses having a portion for near and a portion for distant vision, the portion for near vision of each lens being formed with prism of such power as to automatically converge the direct vision of both eyes to a common and proper near point.

7. The process of simultaneous construction of a pair of lenses having distinct portions for near and for distant vision, consisting in grinding the portion for near vision while the parts are held in target formation, the portion for near vision forming the bull's-eye and the axis of grinding lying in the plane of separation of the lenses and at an angle to the lenses, whereby the near vision surface when completed will in addition to the focal value produced by its curves possess a prismatic value transversely of the lens.

8. The process of forming a pair of lenses having portions for near and for distant vision, consisting in mounting the lens stock on a suitable holder and abrading the central portion of the lens with a tool whose axis passes to one side of the center of curvature of the distant vision portion of the lens and subsequently separating the stock at the intersection of the plane of the axis on a line passing through the thinnest and the thickest portions of the reading section.

9. A process of forming a pair of bifocal lenses, consisting in grinding the stock for a pair of lenses on one side to a curve for distant vision, maintaining the stock in target formation and simultaneously grinding the adjacent portions of the two lenses to produce near vision portions whose corresponding heights above a common base plane on both sides of the proposed line of separation will be equal but whose corresponding heights above the same base plane on opposite sides of the center line of each individual lens will be unequal, substantially as and for the purpose described.

10. A process of forming a pair of bifocal lenses, consisting in grinding the stock for a pair of lenses on one side to a curve for distant vision, maintaining the stock in target formation and simultaneously grinding the adjacent portions of the two lenses to produce near vision portions whose corresponding heights above a common base plane on both sides of the proposed line of separation will be equal but whose corresponding heights above the same base plane on opposite sides of the center line of each individual lens will be unequal, and subsequently separately grinding the opposite face of each of the lenses to produce a final completed lens having a prismatic addition in the reading portion not present in the distance portion.

11. A process of forming a pair of bifocal lenses, consisting in grinding the stock for a pair of lenses on one side to a curve for distant vision, maintaining the stock in target formation and simultaneously grinding the adjacent portions of the two lenses to produce near vision portions whose corresponding height above a common base plane on both sides of the proposed line of separation will be equal but whose corresponding heights above the same base plane on opposite sides of the center line of each individual lens will be unequal, and subsequently separately grinding the opposite face of each of the lenses to produce a final completed lens having a prismatic addition in the reading portion not present in the distance portion, and forming and mounting the finished lens with its geometrical axis parallel to the original line of separation of the two simultaneously ground lenses.

12. An optical lens formed from a single piece of glass having two visual portions intersecting in a ridge, the thickness of the lens at corresponding points of one visual field on each side of the center line of the lens at the ridge being equal, and the thickness at similar points for the other field being unequal.

13. An optical lens formed from a single piece of material having two distinct visual portions, one of said portions at its geometrical center in the lens being prismatic, and the other of said portions at its geometrical center in the lens being non-prismatic, substantially as and for the purpose described.

14. The process of forming a double vision lens consisting in mounting the stock, abrading the outer portion thereof to form an annular portion adapted to serve as one field for a plurality of lenses, and abrading the central portion of the stock to form the second field of a plurality of lenses, the axis of abrasion of the central field being eccentric to the axis of abrasion of the annular field.

15. The process of forming a double vision lens consisting in mounting the stock, abrading the outer portion thereof to form an annular portion adapted to serve as one field for a plurality of lenses, and abrading the central portion of the stock to form the second field of a plurality of lenses, the axis of abrasion of the central field being eccentric to the axis of abrasion of the annular field, and subsequently separating them along the line determined by the intersection of the common plane of both axes with the said surfaces.

16. The process of forming a double vision lens consisting in forming one side of the pair of lenses with two intersecting surfaces whose axes lie in the plane of separation of the lenses but disposed at an angle to each other.

17. The process of forming a double vision lens, consisting in forming one side of the pair of lenses with two intersecting surfaces whose axes lie in the plane of separation of the lenses but disposed at an angle to each other, and separably forming a proper optical surface on the opposite face of each of the lenses.

18. An optical lens for near and distant vision purposes, having the near vision portion laterally tilted as respects the distant vision portion to produce a relative effect of prism with its base toward the nasal side in the near vision portion of the lens.

19. An optical lens for near and distant vision purposes, having the near vision portion tilted with respect to the distant portion, the thickness of the reading portion at its line of separation from the distance portion being greater on the nasal side than it is on the opposite outer side.

In testimony whereof I have affixed my signature, in presence of two witnesses.

HARRY W. HILL.

Witnesses:
H. E. COLEMAN,
E. M. LAFLER.

Correction in Letters Patent No. 1,321,440.

It is hereby certified that in Letters Patent No. 1,321,440, granted November 11, 1919, upon the application of Harry W. Hill, of Southbridge, Massachusetts, for an improvement in "Lenses," an error appears in the printed specification requiring correction as follows: Page 5, line 4, claim 17, for the word "separably" read *separately;* and that the said Letters Patent should be read with this correction therein that the same may conform to the record of the case in the Patent Office.

Signed and sealed this 9th day of December, A. D., 1919.

[SEAL.]

Cl. 88—54.

M. H. COULSTON,
*Acting Commissioner of Patents.*